United States Patent
Crowder et al.

(10) Patent No.: US 11,303,844 B2
(45) Date of Patent: *Apr. 12, 2022

(54) MEDIA RESOURCE STORAGE AND MANAGEMENT

(71) Applicant: LEVEL 3 COMMUNICATIONS, LLC, Broomfield, CO (US)

(72) Inventors: William Crowder, Camarillo, CA (US); Jeffrey G. Koller, Oxnard, CA (US); David Fullagar, Los Gatos, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/706,656

(22) Filed: Sep. 15, 2017

(65) Prior Publication Data
US 2018/0007310 A1    Jan. 4, 2018

Related U.S. Application Data

(60) Continuation of application No. 13/724,102, filed on Dec. 21, 2012, now Pat. No. 9,774,818, which is a
(Continued)

(51) Int. Cl.
*H04N 5/91*      (2006.01)
*H04N 21/2343*      (2011.01)
(Continued)

(52) U.S. Cl.
CPC ........... *H04N 5/91* (2013.01); *H04N 21/2393* (2013.01); *H04N 21/23439* (2013.01); *H04N 21/47217* (2013.01); *H04N 21/8456* (2013.01)

(58) Field of Classification Search
CPC ............... H04N 5/91; H04N 21/23439; H04N 21/2393; H04N 21/47217; H04N 21/8456
(Continued)

(56) References Cited

U.S. PATENT DOCUMENTS

| 7,062,548 B1 | 6/2006 | Peres |
| 7,565,423 B1 | 7/2009 | Fredricksen |

(Continued)

FOREIGN PATENT DOCUMENTS

| CN | 101110074 A | 1/2008 |
| CN | 101155104 A | 9/2008 |

(Continued)

OTHER PUBLICATIONS

Canadian Examination Report, dated Nov. 14, 2013, Application No. 2,759,221, filed Apr. 26, 2010; 2 pgs.
(Continued)

*Primary Examiner* — Thai Q Tran
*Assistant Examiner* — Nienru Yang

(57) ABSTRACT

A computer-implemented method obtains a plurality of image files, each corresponding to an image in a video stream and builds a common file from a contiguous grouping of the plurality of image files. The video stream has a plurality of contiguous video segments, each having a first video frame, and the plurality of image files correspond to the plurality of first video frames of the plurality of video segments. The plurality of video segments are of approximately equal duration.

20 Claims, 13 Drawing Sheets

Related U.S. Application Data continuation-in-part of application No. 13/342,522, filed on Jan. 3, 2012, now Pat. No. 10,255,229, which is a division of application No. 12/767,338, filed on Apr. 26, 2010, now Pat. No. 8,140,672.

(60) Provisional application No. 61/582,303, filed on Dec. 31, 2011, provisional application No. 61/172,638, filed on Apr. 24, 2009.

(51) Int. Cl.
    *H04N 21/239* (2011.01)
    *H04N 21/472* (2011.01)
    *H04N 21/845* (2011.01)

(58) Field of Classification Search
    USPC .......................................... 386/278
    See application file for complete search history.

(56) References Cited

U.S. PATENT DOCUMENTS

| | | | |
|---|---|---|---|
| 9,092,558 B2 | 7/2015 | Geiner | |
| 2001/0013123 A1* | 8/2001 | Freeman | H04H 60/07 725/34 |
| 2002/0133593 A1 | 9/2002 | Johnson et al. | |
| 2002/0147770 A1 | 10/2002 | Tang | |
| 2002/0157112 A1* | 10/2002 | Kuhn | H04N 21/234336 725/113 |
| 2005/0198570 A1* | 9/2005 | Otsuka | G11B 27/28 715/201 |
| 2006/0143404 A1 | 6/2006 | Chen et al. | |
| 2006/0271972 A1* | 11/2006 | Pai | H04N 21/2225 725/86 |
| 2007/0002946 A1* | 1/2007 | Bouton | H04N 19/15 375/240.01 |
| 2007/0162611 A1 | 7/2007 | Yu | |
| 2007/0268164 A1 | 11/2007 | Lai et al. | |
| 2007/0288485 A1 | 12/2007 | Shin et al. | |
| 2008/0059565 A1 | 3/2008 | Turner | |
| 2008/0091711 A1 | 4/2008 | Snodgrass | |
| 2008/0215747 A1 | 9/2008 | Menon et al. | |
| 2008/0228920 A1 | 9/2008 | Souders et al. | |
| 2009/0019091 A1 | 1/2009 | Horvitz et al. | |
| 2009/0022362 A1* | 1/2009 | Gagvani | G06T 7/254 382/100 |
| 2009/0037382 A1* | 2/2009 | Ansari | G06Q 30/04 |
| 2009/0049238 A1 | 2/2009 | Zhang et al. | |
| 2009/0083279 A1 | 3/2009 | Hasek | |
| 2009/0307741 A1* | 12/2009 | Casagrande | G11B 27/034 725/137 |
| 2010/0325264 A1 | 12/2010 | Crowder et al. | |
| 2011/0262111 A1 | 10/2011 | Thornberry et al. | |
| 2012/0102181 A1 | 4/2012 | Crowder et al. | |
| 2013/0212342 A1 | 8/2013 | McCullough | |
| 2013/0251339 A1 | 9/2013 | Crowder et al. | |

FOREIGN PATENT DOCUMENTS

| | | |
|---|---|---|
| JP | 2004-533738 A | 11/2004 |
| NZ | 566291 A | 12/2008 |

OTHER PUBLICATIONS

Chinese Examination Report, dated Nov. 29, 2013, Application No. 201080027928.9, filed Apr. 24, 2009; 10 pgs.

Chinese Second Examination Report, dated Jul. 9, 2014, Application No. 201080027928.9, filed Apr. 26, 2010; 11 pgs.

Chinese Third Examination Report, dated Jan. 5, 2015, Application No. 201080027928.9, filed Apr. 26, 2010; 9 pgs.

European Examination Report, dated Mar. 27, 2017, Application No. 10767894.8, filed Apr. 26, 2010; 3 pgs.

Extended European Search Report, dated Feb. 19, 2016, Application No. 10767894.8, filed Apr. 26, 2010; 8 pgs.

International Search Report, International Publication No. WO2010/124291, Appl. PCT/US2010/032436, International Filing Date Apr. 26, 2010, Date of Mailing Search Report Jun. 29, 2010 , 3 pgs.

Korean Examination Report, dated Apr. 26, 2013, Application No. 2011-7026385, 8 pgs.

Non-Final Office Action, dated Oct. 10, 2013, U.S. Appl. No. 13/724,102 filed Dec. 21, 2013; 12 pgs.

Non-Final Office Action, dated Oct. 11, 2013, U.S. Appl. No. 13/342,522, filed Jan. 3, 2012; 15 pgs.

Partial Supplementary European Search Report, dated Nov. 3, 2015, Application No. 10767894.8, filed Apr. 26, 2010; 5 pgs.

Written Opinion of the International Searching Authority, International Publication No. WO 2010/124291, Appl. PCT/US2010/032436, International Filing Date Apr. 26, 2010, Date of Mailing Written Opinion Jun. 29, 2010 , 5 pgs.

* cited by examiner

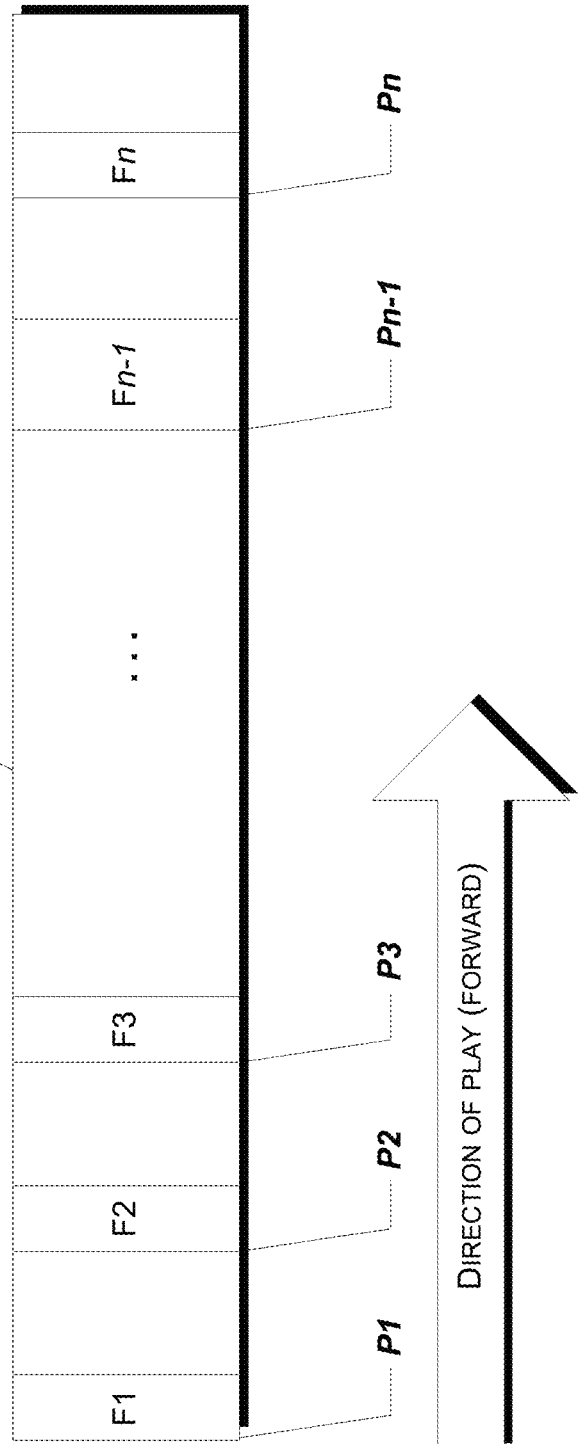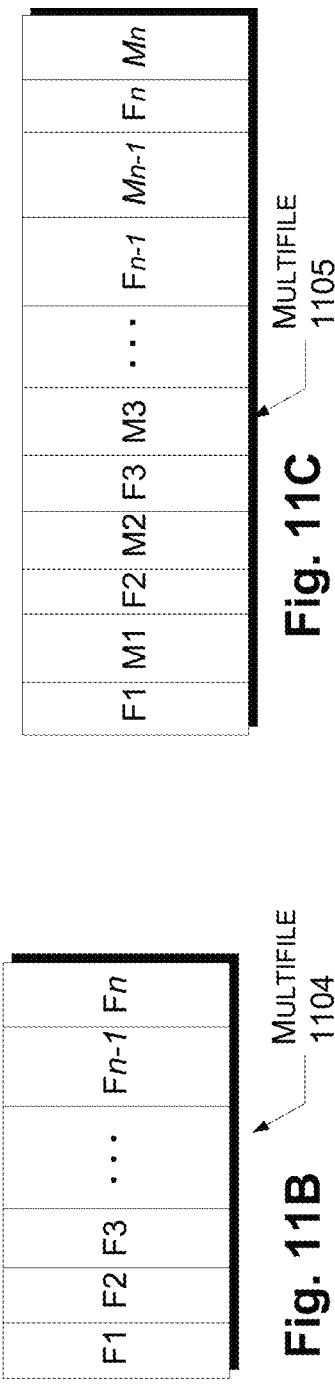

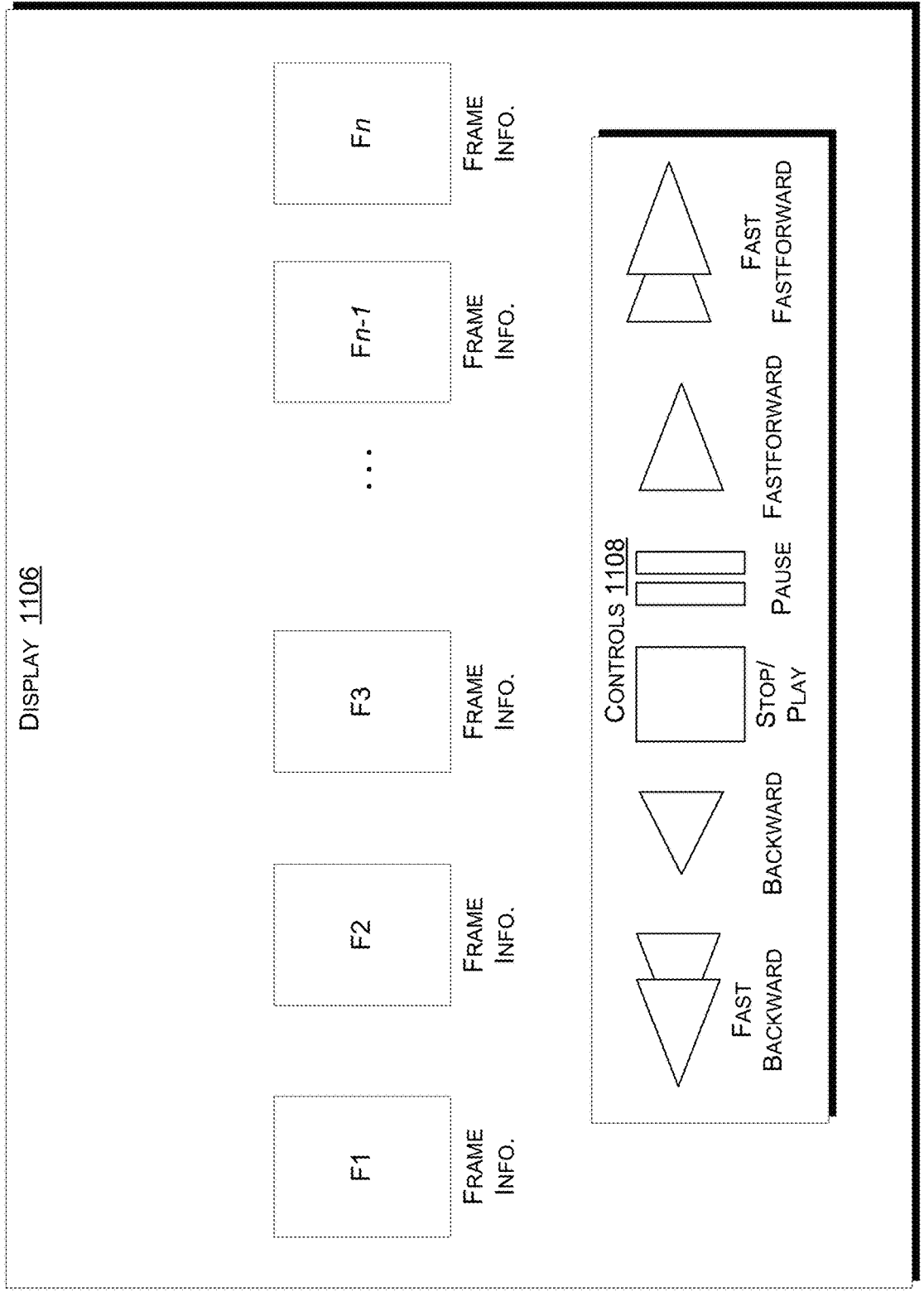

MEDIA RESOURCE STORAGE AND MANAGEMENT

RELATED APPLICATIONS

This application is related to and claims priority from U.S. application Ser. No. 13/724,102, filed Dec. 21, 2012, which is a Continuation-in-part (CIP) of U.S. Ser. No. 13/342,522, filed Jan. 3, 2012, which is a division of U.S. Ser. No. 12/767,338, filed Apr. 26, 2010, published as US 2010-0325264, and issued as U.S. Pat. No. 8,140,672 on Mar. 20, 2012, and which claims benefit of U.S. Provisional Application No. 61/172,638, filed Apr. 24, 2009. Application Ser. No. 13/724,102 also claims priority from U.S. Provisional Application No. 61/582,303, filed Dec. 31, 2011. The entire contents of each of these applications (U.S. Ser. No. 13/342,522, U.S. 61/582,303; U.S. Ser. No. 13/724,102; U.S. Ser. No. 12/767,338; and U.S. 61/172,638) are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND

Summary

Embodiments generally disclosed herein include a computer-implemented method and system for performing media resource storage and management. The computer-implemented method and system implemented as a request manager is capable of monitoring requests for media resources in a content delivery network. For each monitored request, the request manager determines whether to generate a multi-file for the requested media resource. For example, the request manager can first determine whether the media resource is eligible for multi-file generation. If eligible, the request manager then determines whether the media resource has reached a popularity threshold. If the media resource has reached the popularity threshold, the request manager initiates generation of the multi-file for the requested media resource. Generally, the generated multi-file is stored in a storage system associated with the content delivery network.

BRIEF DESCRIPTION OF DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 11A-11C depict application of multifiles to video content;

FIG. 11D depicts an interface to an end-user for moving around within a video.

Throughout the drawing figures, like reference numerals will be understood to refer to like parts and components.

DETAILED DESCRIPTION

Figure 1:
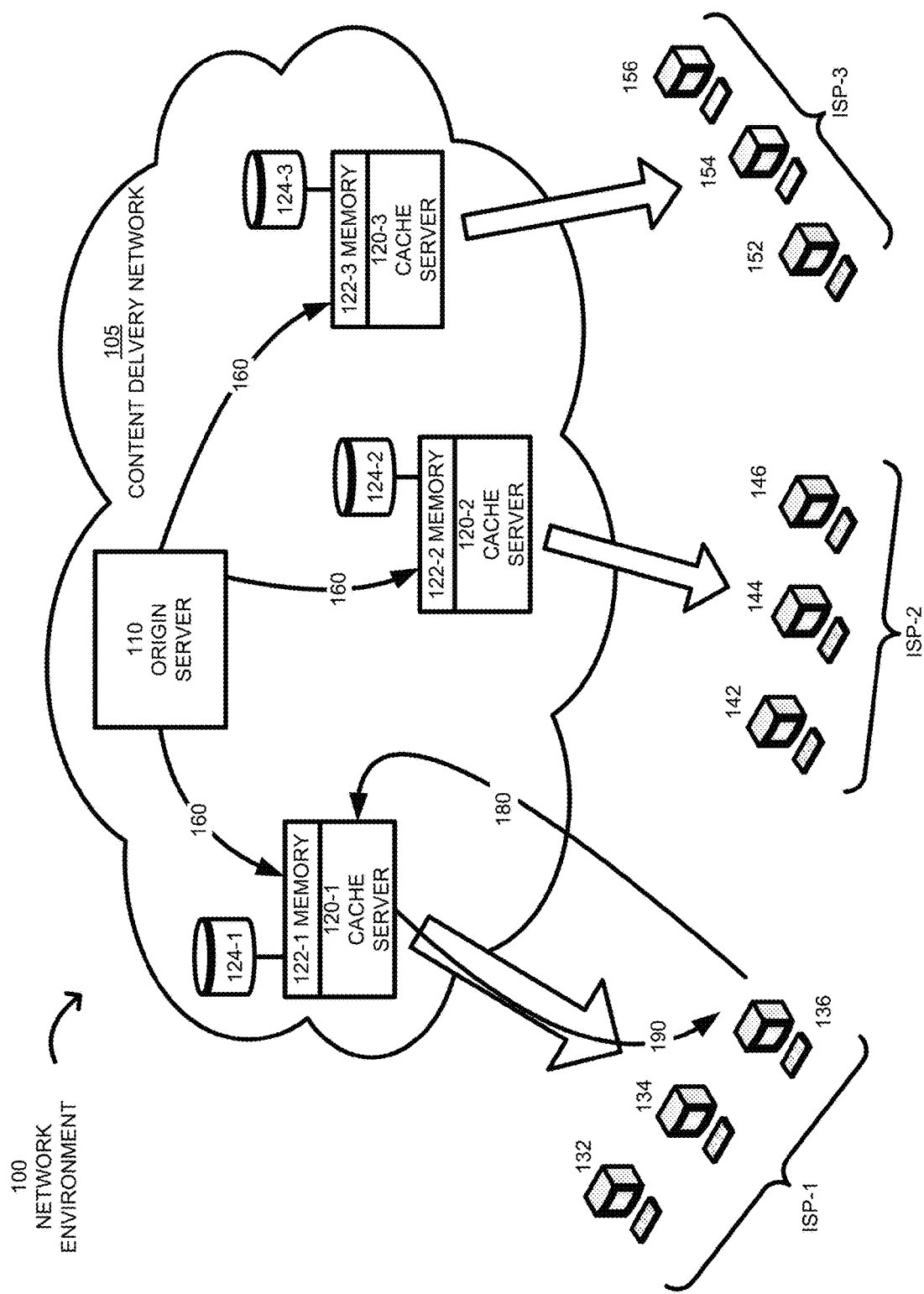
FIG. 1 is a block diagram of a network environment for media resource storage and management in accordance with an example embodiment.

Generally, embodiments disclosed herein provide for improved methods and systems for media resource storage and management. In particular, the methods and systems described throughout the specification relate to identifying media resources (e.g., digital music, movies, web content, software, etc.) that are suitable for multi-file generation. Media resources suitable for multi-file generation typically meet two requirements: 1) eligibility (e.g., a large resource or file composed of many smaller and sequential/ordered portions, and 2) popularity of the media resource. Such improvements will become apparent in the discussion of the embodiments and related figures below.

Conventional operating systems and file systems typically do not store small resources or files in a sequentially manner on disk storage. Thus, if storage of a large file (that consists of many independent smaller files) is spread over various sectors and/or tracks of a disk or platter, retrieval of the collective large file may require many onerous seek operations by the disk head to situate itself over the correct sectors and/or tracks where the data are located. If the file system or operating system that manages disk storage does not recognize the smaller portions as being part of a single large file, then the file system or operating system will likely spread the portions across the disk according to an optimal storage algorithm for storing smaller files. However, such non-sequential storage can potentially cause a new random access (e.g., head seek plus rotational positioning) per smaller portion each time a smaller portion is retrieved.

Generally, a multi-file is a single entry in the cache which contains multiple resources in a certain order. In this manner, multi-files contain resources in the same order in which they are likely to be requested. Two advantages of the multi-files regime include:

1) enabling loading of multiple related resources from disk using fewer operations (file opens, disk reads) than would be required to load the portions individually. In particular, having multiple entries in a single large file enables the cache to perform more efficiently than with small (unrelated) files.

2) keeping related data "close together" on disk, thereby limiting the seek overhead required to load the resources, even when multiple operations are required to do so.

Multi-files are especially useful when the related resources are relatively small, and when the request profile is such that many resources are simultaneously popular, thereby preventing the cache from having to maintain all the resources in memory. By enabling the retrieval of the resources from disk using fewer, more efficient operations, and by keeping the related data close together on disk, performance is improved even when the cache is running disk-bound.

Furthermore, the administration of multi-files can be performed at the application level, thus providing an abstraction from any underlying file systems or operating systems and their associated memory management regimes.

One such example of a large resource being comprised of many smaller portions is digital video. Since digital video playback can have varying resolutions (e.g., the higher the resolution, the higher the bandwidth required), a single video can have a range of resolutions from which a user or software application can choose. Thus, during playback of a video being streamed to an end user's computer, a playback application executing on the user's computer can dynamically adjust the resolution of the video in response to changes detected in the streaming bandwidth. To accomplish this, content providers create a separate video file or resource for each distinct resolution and then break each of these separate resolution files into smaller chunks (e.g., 2 second portions). The smaller the granularity of the video portions or chunks, the less an end user will notice the effects of bandwidth fluctuation. For example, assume that a digital video has 5 different resolutions and, thus, 5 different video files for the same content (i.e., 1 being the lowest resolution requiring the least amount of bandwidth). Further assume that each of the 5 different video files is broken into smaller sequential portions ranging from 1-100. Suppose that while the video is being streamed to an end user using the fifth and highest resolution, the bandwidth degrades during playback of portions 44 and 45. In such a case, the playback application can detect this decrease in bandwidth and request the video file associated with the lower, say, fourth resolution to be streamed to the end user. In response to the request for lower resolution video, the playback application would then receive portions 46, 47, . . . , etc., associated with the video file having the fourth and lower resolution to accommodate for this fluctuation in bandwidth.

It is therefore beneficial to generate/create multi-files that store multi-resolution large video files made up of many smaller portions in a sequential manner in disk storage. In particular, if a requested video file is not already in static memory or cache, multi-files can be quickly and efficiently retrieved from disk storage and served to end users and/or loaded into cache. Furthermore, in a multi-tiered content delivery environment, multi-files stored on origin servers and/or intermediate servers can be transferred and distributed more efficiently to downstream cache servers.

It should be noted that multi-files are not just limited to video content. For example, multi-files can be used as a type of "pre-fetching" technique to preemptively acquire images or logos associated with various traditional web content, such as with Hyper Text Markup Language "HTML" pages.

Now, more specifically, FIG. 1 is a block diagram of a network environment 100 having a content delivery network 105 that includes an origin server 110, cache server 120-1, cache server 120-2 and cache server 120-3 (hereinafter collectively cache server 120). Each cache server 120 has a respective cache memory 122-1, 122-2, and 122-3, and a respective storage system 124-1, 124-2, and 124-3 (e.g., disk-based storage). Cache server 120-1 services requests and provides content to end users 132, 134, and 136 (e.g., client computers) associated with Internet Service Provider 1 (ISP1), cache server 120-2 services requests and provides content to end users 142, 144, and 146 associated with ISP2, and cache server 120-3 services requests and provides content to end users 152, 154, and 156 associated with ISP3.

The network environment 100 in FIG. 1 portrays a high level implementation of content delivery network 105 suitable for implementing and facilitating functionality of the various embodiments described herein. Content delivery network 105 represents just one example implementation of a content delivery network and, as such, it should be noted that the embodiments described herein are similarly applicable for being implementation in any content delivery network configuration commonly practiced in the art.

During general operation, the origin server 110 distributes various content (e.g., depending on geography, popularity, etc.) to cache server 120 as shown by lines 160. Assume, for example, that end user 136 requests certain content (e.g., music, video, software, etc.) that is stored on the origin server 110. Since, e.g., cache server 120-1 is optimally configured/located to deliver content to end users in ISP1, the end user 136 is redirected using any number of known methods to instead request the content from cache server 120-1. The cache server 120-1 can be selected from the group of cache servers 120 using any number of policies (e.g., load balancing, location, network topology, network performance, etc.). End user 136 then requests the content from cache server 120-1 as shown by line 180. Cache server 120-1 then serves the content to end user 136 (line 190) either from cache 122-1 or, if the content is not in the cache, from storage system 124-1.

Embodiments herein generally relate to methods and systems associated with functionality at the cache servers 120 as described further below with respect to FIG. 2-10.

Figure 2:
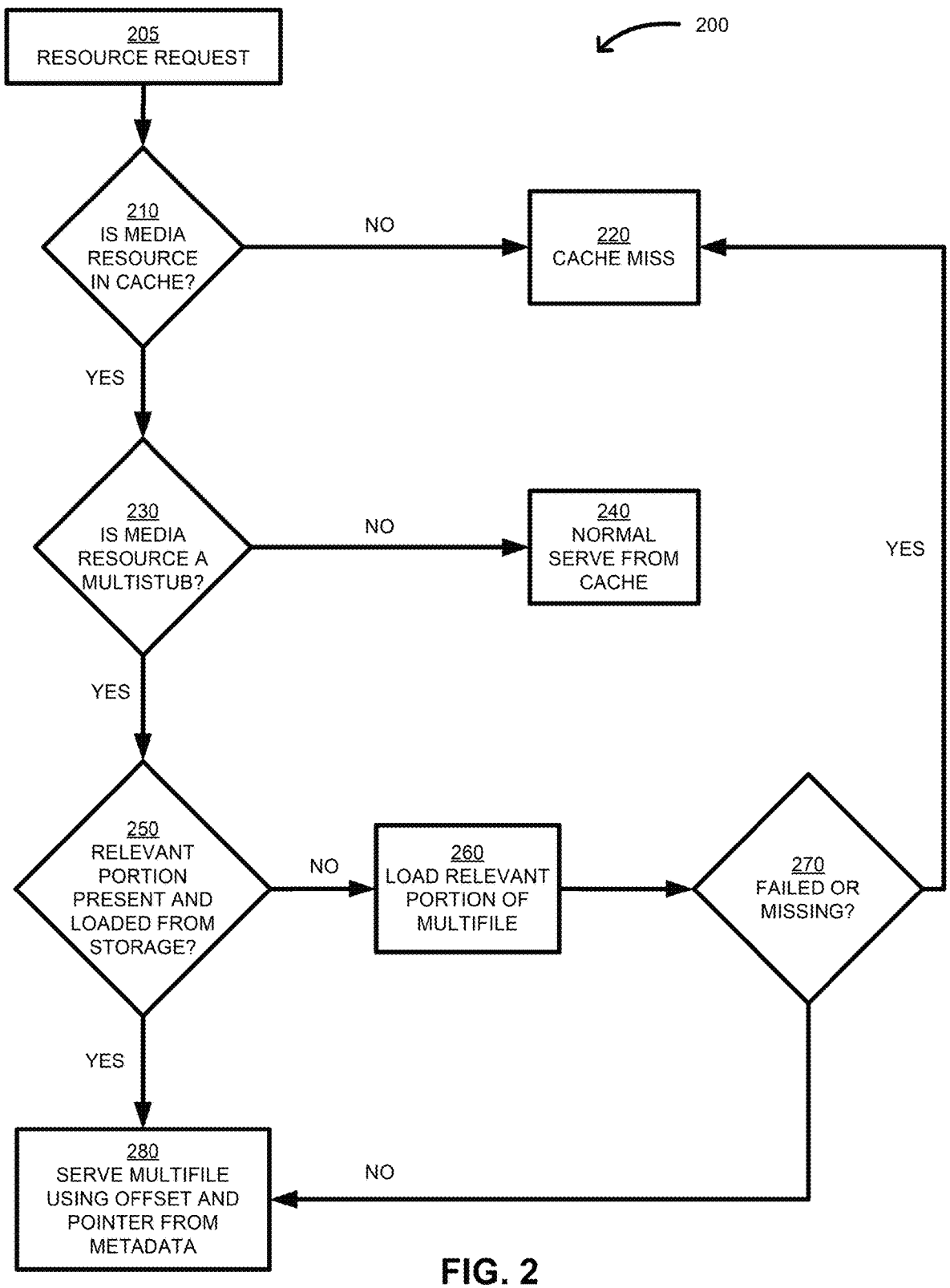
FIG. 2 is a flow chart that shows processing operations associated with serving multi-files in accordance with an example embodiment.

FIG. 2 is a flowchart that shows processing operations related to serving multi-flies from a cache server (e.g., in a content delivery network).

In an example embodiment, there are two new types of StoreEntries. The first is called a "multistub." This type of entry does not have any actual resource data associated with it. Rather, it has information about which "multi-file" entry (the other new type of StoreEntry) contains the resource and the resource's offset and size within the multi-file entry. Additional metadata that contains this information is kept in memory in a data structure called a multistub_t. Note that the offset in the multistub metadata does not include the multi-file's swap header size. However, it does include the HTTP reply on the multi-file. Multistub entries carry the normal public key for the resource.

In continuing with the example embodiment above, multi-file entries are generally similar to normal cache entries, except that they carry a messaging signal (e.g., HTTP reply) along with additional metadata regarding the low and high sequence numbers within the associated multi-file. These data are carried in a multi-file_t structure. Multi-files can have public keys that are based on unique data to avoid collisions.

According to one example embodiment, the process of serving data (i.e., content) from a multi-file in a cache server is as follows (as generally shown in FIG. 2):

Upon receipt of a request for content (e.g., web page, video, etc.), it is first determined whether the resource is in fact already in the cache (step 210). If the requested content is not in the cache, the request is treated as a cache miss (step 220).

If the content is determined to be in the cache, a storeClientListAddImpl( ) routine determines whether a multistub bit is set in the FPMCP metadata for the resource (step 230). If the multistub bit is set, then the process proceeds to step 250, which can be a call to storeCfientPrepareMulti-file( ). If the multistub is not set, then content is served in the normal manner from cache (step 240).

The storeClientPrepareMulti-file( ) routine determines if the multi-file's memory object is present and has been populated (step 250). If it has been, then the mf_file_base member of the store_client structure is populated using offset data from the multistub metadata (step 260). Moreover, the multi-file_entry member of the store_client structure is populated with a pointer to the multi-file entry itself (step 260). Note that in one embodiment, whenever a client is using a multistub entry, both the multistub entry and the multi-file entry are locked.

If the storeClientPrepareMulti-file( ) routine determines that the memory object of the multi-file entry still needs to be populated, it uses storeClientListAdd( ) and storeClientCopy( ) routines on the multi-file entry and a storeClientPrepareMulti-fileCallback( ) routine as the callback routine. This callback routine determines if the multi-file swap-in was successful (step 270) and, if so, populates the appropriate store_client structure members (step 260). The callback routine then unregisters from the multi-file entry and starts the copy process for the clients of the multistub entry.

If a multistub entry references a missing multi-file, or if the multi-file was not properly swapped in, such a scenario is handled as a swap-in failure for the multistub entry (step 270). This causes a cache miss (step 220) which eventually results in the multistub entry being replaced (by a normal data/content entry, not a multistub entry).

Furthermore, the storeClientCopy2( ), store ClientFileRead( ) and storeClientMmapCacheCopy( ) routines can use the multi-file_entry and mf_file_base members of the store_client structure to locate the appropriate swap file and adjust the client's copy_offset appropriately.

The following discussion describes various embodiments of multi-files are built (i.e., packed, generated, etc.) in a cache server. Note that these embodiments are being described in the manner below for purposes of example only.

In one example embodiment, build specification management can be performed by the following routines:

"mf_set_spec": Set (or clear) the build specification for a coserver.

"mf_get_spec": Get the build specification for a coserver. This is typically used for output only, that is, multi-file.c generally doesn't use mf_get_spec( ) itself.

Multi-file specifications are stored in mf_spec_t data structures. These structures also contain a table of multi-files which are in the process of being built (the build_tab member of the mf_spec_t) or which have been queued for a future build. The hash table containing these structures is mf spectab and is keyed by the coserver ID.

The build_tab hash table within each mf_spec_t contains mf_build_t data structures which are used to manage the building process.

Multi-file-eligible resources are detected by a mf_check_eligibility( ) routine, which is called from clientSendMoreData( ) when it starts serving a resource for a coserver which has a multi-file specification. Two bits in the fpmcp_addl.flags structure, mf_checked and mf_eligible, are used to avoid redundant checking for eligibility (mf_checked) and to remember whether a resource is indeed eligible (mf_eligible).

The mf_check_eligibility( ) routine checks for a build specification and then determining whether the requested resource's URL matches the regular expression contained therein. If the URL matches and the sequence number portion scans properly using the specified scanf( ) string, the resource is deemed eligible.

Once a resource is determined to be eligible, then clientSendMoreData( ) calls mf_note_hit( ) each time the resource is served. On each mf_note_hit( ) call, the mf_hit_count field of the fpmcp_addl structure is incremented. Once the hit count reaches the trigger value specified in build specification, the build process is started. In one embodiment, the hit count information is not kept on per-basename basis (rather than a per-resource basis), because the cache does not know a priori how many hits may be associated with a given basename.

Continuing with the above example, once the trigger value is reached, the mf_maybe_start_build( ) routine is called from mf_note_hit( ). This routine first checks to see if a build is already in progress and avoids starting another one if it is. If no build is in progress, an mf_build_t structure is allocated and placed in the build_tab associated with the build specification. A template is created which may be used to construct URLs for resources with the specific base name being built. Once the template is created, a mf_build_submit( ) routine is called. The mf_build_submit( ) routine either starts the build immediately or queues the new build if too many builds are already in progress.

Note that in one embodiment the template consists of "% s" followed by the "seqstring" of the build specification, followed by another "% s." This configuration avoids issues associated with the URL containing %-escapes and aligns with the URLs deconstructed into prefix and suffix portions.

Figure 3:
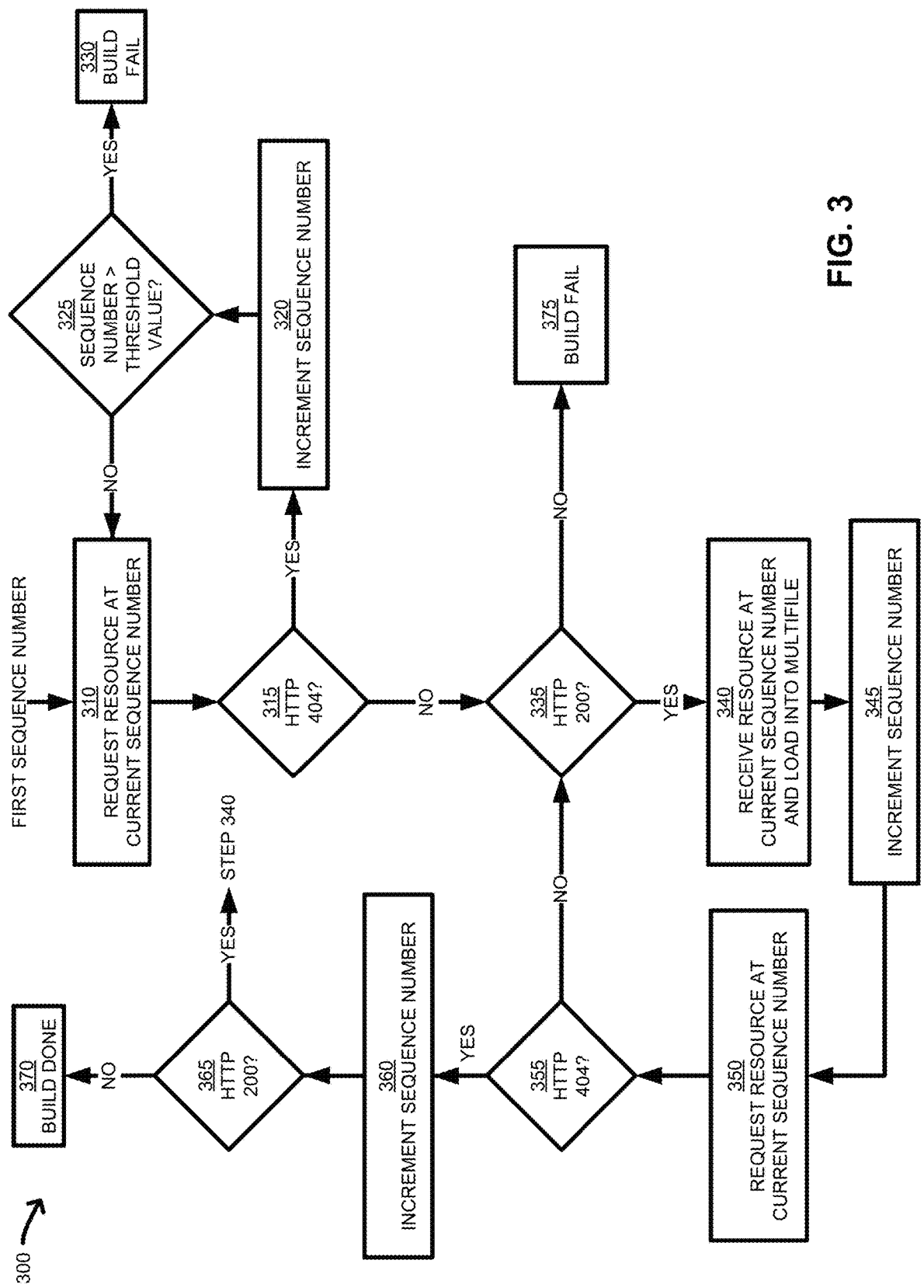
FIG. 3 is a flow chart that shows processing operations associated with building multi-files in accordance with an example embodiment.

FIG. 3 is a flowchart that shows processing operations related to an example multi-file building process in a cache server (e.g., as part of a content delivery network). Note that any reference made to an origin server below also is meant to include intermediate content servers that may reside between the cache server and the origin server in a content delivery network.

Initially, at step 310, a cache server process finds the first valid resource of the sequence in the origin server by starting at and requesting the specified "lowstart" sequence number (or 0 if not specified) and then analyzes the response code returned by the origin server (e.g., HTTP 404 response code). For example, HTTP 404 response codes encountered in this state cause the process to iteratively find the next sequence number until a successful response code is returned (e.g., HTTP 200 status code) or the "highstart" (e.g., default 10) sequence number is reached (steps 315, 320 and 325). For instance, if no HTTP 200 status code is encountered after requesting resources within the range, the build fails (step 330).

Once the first resource is found (returned HTTP 200 status code, step 335), the process begins to build multi-files by issuing requests to the origin server for sequential sequence numbers (steps 340, 345 and 350) until an HTTP 404 response code is encountered (step 355). At that point, the build is complete (step 360). If at any point neither an HTTP 404 nor HTTP 200 response/status code is returned, the build fails (step 365).

A complication can arise when a resource is temporarily "missing" on the origin server (e.g., returns an HTTP 404 response code even though resources with higher sequence numbers are available). Note that the build process proceeds through at least the sequence number corresponding to the request which started the build. Even if the build was triggered by a request for a lower sequence number, after an HTTP 404 response code is encountered, the process checks the cache to determine whether the resource with the next sequence number is already present. If so, the HTTP 404 response code is considered a "missing" resource and the build continues using the next sequence number. In this example embodiment, only the cache is checked. In other words, no "confirmation" request is made to the origin server as this condition is considered unusual and is not worth the expense of contacting the origin server to confirm the that build is done, especially since the origin server was just recently contacted with a request for the previous sequence number.

Continuing with the above example, data for building the multi-files can be retrieved via a general purpose interface in a client_side.c, clientStartInternal( ) routine. The clientStartInternal( ) routine allows other parts of the cache server operating system to make requests just as if they were normal clients. Such requests may hit in the cache or may miss and will go through most of the normal request processing. The data are fed back to the internal client via an internal client callback routine, which is provided a pointer to the data that would have been placed on the wire had the request come from an actual client. Additionally, for convenience, a pointer to the StoreEntry being served is provided. The build process can use this data to construct the multi-files.

The process is driven by the mf_build_callback( ) routine, which is the callback given to the clientStartInternal( ) routine. This routine manages the build state machine. For example, states can be handled in using the following routines:
  "mf_build_hdl_start" (MFB_START state): Finding the resource with the first sequence number.
  "mf_build_hdl_start_next" (MFB_START_NEXT state): Starting the next entry in the multi-file.
  "mf_build_hdl_appending" (MFB_APPENDING state): Appending data to the multi-file.

In operation, each routine is called until it returns a "finished" indication, at which point the mf_build_callback( ) routine returns. When a state handler wishes to handle the next state immediately, it returns 0 ("not finished"), otherwise it returns 1 ("finished").

Two other states may also exist:
  (MFB_DONE state): the build is complete.
  (MFB_VERIFYING): when in the process of constructing multi-files, an entry which is already in a multi-file (i.e., a multistub entry) is also encountered.

MFB_DONE is handled directly in the mf_build_callback( ) routine. This routine arranges to finish the current multi-file and free up the build state so that the next build in the queue, if any, can begin.

MFB_VERIFYING can be used, for example, when some entries which were in multi-files have expired and have been reloaded. The reloads result in normal cache entries and the build operation is restarted when the normal entries reach a desired popularity (i.e., the hit count reaches the target or trigger value).

Another use for the MFB_VERIFYING state occurs when the cache server was shut down while in the process of building multi-files. In this case, there may be entries in the cache which have not yet been built, or there may entries which belong in multi-files but haven't yet made it into the cache. After the cache server starts again, if those entries (either existing ones or newly loaded ones) receive enough hits (i.e., reach the desired popularity), the build operation is restarted.

Yet another use for the MFB_VERIFYING state occurs when there was an issue with a multi-file that caused a swap-in failure when a multistub entry referencing that multi-file was accessed. In this case, the resource is reloaded as a normal entry and if it (or similar entries) receives enough hits, the build operation is restarted.

Still another use for the MFB_VERIFYING state occurs when the reloaded or not-yet-built entries are not immediately built into multi-files. Rather, these entries have their hit counts incremented as requests are made. Then, when the trigger value is reached, the build operation restarts. Such an operation may then encounter already-built multi-files as it proceeds. This condition is detected in the mf_build_hdl_start_next( ) routine's state handler. In such a scenario, it needs to be determined whether to rebuild resources from the existing multi-file or, instead, skip over the existing multi-file and restart the process at the next sequence number after the existing multi-file (which, of course, may also be the start of another multi-file).

The following example describes the first part of the decision described above. If the multi-file being built has not reached at least ¾ of its target size, then entries from the existing (complete) multi-file are rebuilt. This normally results in a rebuild of all the subsequent entries. Such a rebuild tends to keep multi-files optimally sized at the expense of some redundant disk activity. Note that in this case, the MFB_VERIFYING state is never entered. Rather, the state moves to an MFB_APPENDING state and the data are built into multi-files as previously described, even though the data/content is acquired from a multi-file.

Still assuming the multi-file being built has reached at least ¾ of its target size, the MFB_VERIFYING state is entered. The example process, which can be handled by mf_start_verify( ) and mf_hdl_verify( ) routines, consists of a) checking that the encountered multi-file is not small. In other words, determining whether the multi-file full-sized, and b) verifying that every entry in the cache for the sequence numbers the multi-file encompasses do indeed point at that multi-file. This latter check may require several URL constructions and cache lookups which can be handled by a mf_hdl_verify( ) routine. For example, the mf_hdl_verify( ) routine is an event handler which does limited work each time it is called.

Continuing with the above example, and assuming the encountered multi-file is properly verified, the multi-file is skipped over and the build process resumes at the next sequence number. It is possible that resources will fall out of the cache and be reloaded while the encountered multi-file is being verified. If this happens, the build process will start again once the associated trigger value has been reached. Unless resources are expiring very quickly (or the cache is thrashing), this situation should resolve itself within a few iterations.

Another scenario can occur when errors are encountered during the build process. Such errors can include, by nonlimiting example: swap-in failures (while reading cache contents), swap-out failures (while building multi-files), resources being aborted while they are being built (fill failures), and receipt of a bad HTTP status code (e.g., HTTP 503 status code if the origin server can't be reached). If such errors are encountered before any of the data for an entry has been added to the multi-file, the operation is simply retried (e.g., to avoid thrashing). If too many errors are encountered, the build is stopped at its current state. Then, if resources that haven't been built continue to get hits, the build operation is restarted at later time (although, in some circumstances, this particular build is moved to the end of the queue), thus skipping over already-built multi-files as described above.

If an error is encountered while an entry is being appended to a multi-file, the multi-file is abandoned and released and the process restarts at the first sequence number in the abandoned multi-file. In an example embodiment, the process truncates the multi-file at its last known 'good' offset and then restarts at that point.

In another scenario, if the multi-file entry being constructed experiences a swap-out failure, the infirm multi-file is released and the process is restarted at the sequence number at the beginning of that multi-file.

Figure 4:
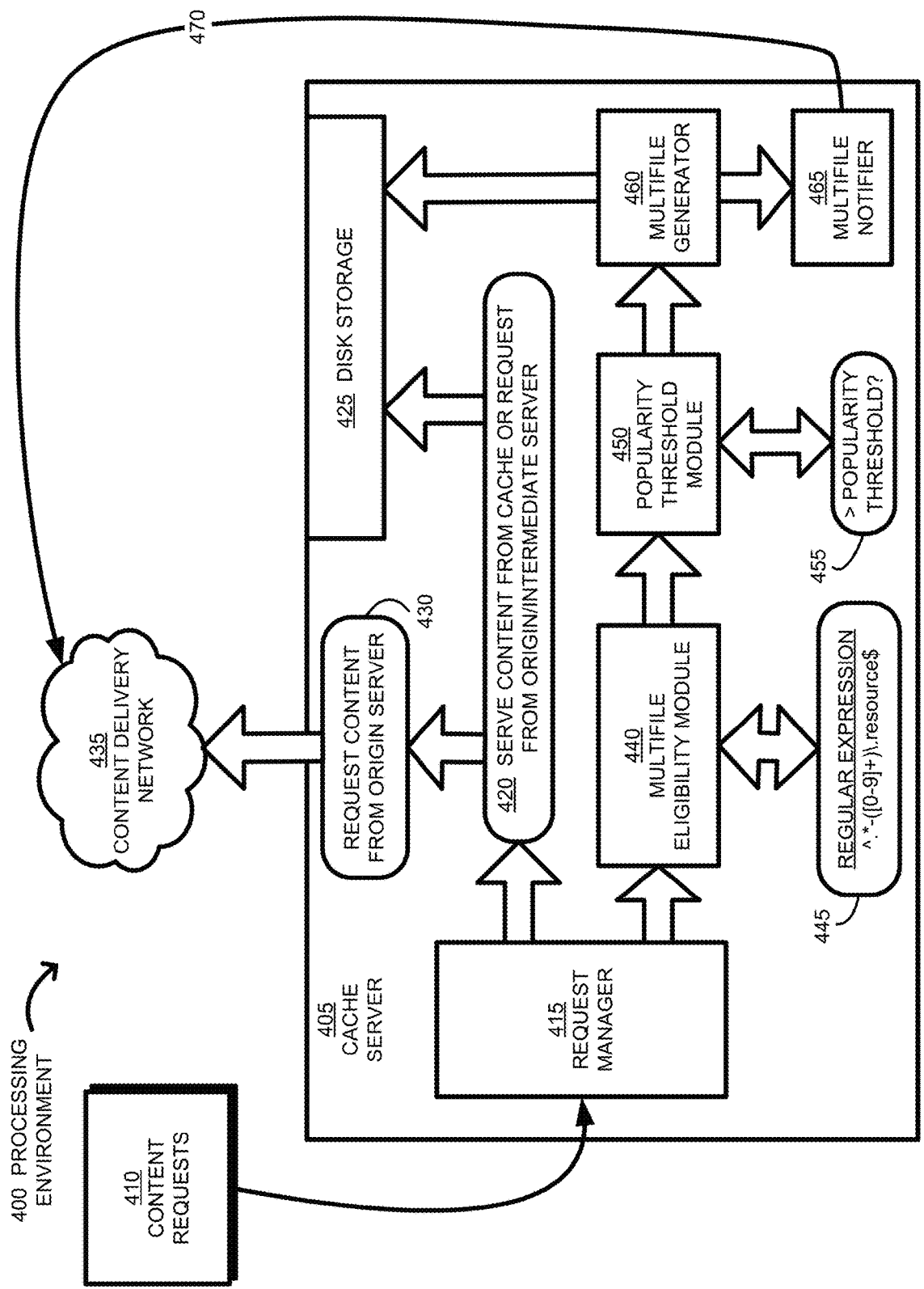
FIG. 4 is a block diagram of a processing configuration for media resource storage and management in accordance with an example embodiment.

FIG. 4 is a block diagram of a processing environment 400 that shows functionality of a cache server 405. During general operation, the cache server 405 receives content requests (i.e., requests for media resources such as video, audio, web content, games, etc.) and processes these requests at the request manager 415.

On one hand, the request manager 415 processes the request 410 to ultimately delivery the requested content to an end user(s). This is shown by processing step 420. The cache server 405 serves the content from the local disk storage 425 if the content is already loaded into the cache. If not, the cache server 405 retrieves the retrieves the content from an origin or intermediate content server via content delivery network 435, and then serves the content to the end user. According to one example embodiment, the content retrieved from the origin or upstream server is additionally stored in the cache memory system 425 and/or the disk storage system 430 depending on various conditions.

In another embodiment, the request manager 415 processes the content request 410 for potential multi-file generation. This processing may be performed prior to, during, or subsequent to serving the requested content to the end user as described above.

First, the request manager 415 passes the request to the multi-file eligibility module 440. The multi-file eligibility module 440 analyzes a Uniform Resource Locator (URL) associated with the content request 410 against a regular expression. Generally, regular expressions are syntactical and grammatical tools useful for identifying strings of text of interest, such as particular characters, words, or patterns of characters.

According to one example embodiment, and referring back to the previous example, the regular expression parses a content request's URL into four components: i) base name, ii) sequence number, iii) prefix, and iv) suffix. The base name is the portion of the URL which is invariant across related resources (e.g., resources having the same content but different resolutions), and is constructed from the entire URL not including whichever portion matches the sequence number portion. The sequence number portion of the URL contains sequencing information associated with the portions of the larger media resource. The prefix portion of the URL appears before the sequence number portion—and, this may be an empty set. The suffix portion of the URL appears after the sequence number portion.

For example, the following regular expression can be used to parse incoming URLs associated with requests for media resources or content:

Regular Expression:^.*-([0-9]+)\.resource$

URLs:/type1-1.resource

/type1-2.resource

/type1-3.resource

Note that only a single sub-expression, to match/extract the sequence number portion of the URL, is required. However, multiple sub-expressions may be used if needed. In this example, the appropriate sub-expression number is 1 since sub-expression numbers start at 1 and not 0. This serves not only to parse the resource name into the component parts (i.e., base name, sequence number, prefix, and suffix), but also to filter out resources which are not multi-file enabled (by not matching the regular expression). For the example above, the base name is "/type1-.resource", the sequence number portion is the number following the "-", the prefix is "/type1-" and the suffix is ".resource".

If the multi-file eligibility module 440 determines that the URL associated with the content request matches the regular expression, then, according to one example embodiment, the resource associated with the resource request is deemed eligible for multi-file generation or building. Note that when a resource is deemed 'eligible' it does not necessarily mean that a multi-file will be generated for the eligible resource. Alternatively, if the URL does not match the regular expression (or the multi-file eligibility module 440 deems the requested resource ineligible for some other reason), then the multi-file processing at the cache server 405 does not proceed—even though the request will still be processed in accordance with normal cache serving procedures per processing step 420.

According to other example embodiment, the multi-file eligibility module 440 can use pattern recognition and/or sequence forecasting techniques commonly known in the art to determine the eligibility of media resources for multi-file generation. Similarly, multi-file eligibility may be determined based on content type such as video versus audio, based on compression format such as MPEG versus WMV, based on transmission protocol such as HTTP versus RTSP, etc., and/or any combination thereof.

After a resource is determined to be eligible for multi-file generation, processing is passed to popularity threshold module 450. Since actual multi-file generation can require a high expenditure of system resources, particularly that of the disk storage 425, it is important to generate multi-files for only those media resources that are frequently requested (e.g., popular content).

For example, in one embodiment each particular media resource (e.g., movie A, movie B, etc.) has an associated frequency counter that keeps track of how many times that particular media resource has been requested. In this manner, the frequency counter may track the number of content requests that have been received at cache server 405, or the counter may track the aggregate number of content requests that have been received at other cache servers in the content delivery network 435. Once the popularity threshold module 450 receives the content request 410, for instance, it can increment a frequency counter associated with the particular content or media resource associated with the request. If the frequency counter equals or exceeds the popularity threshold value at processing step 455, then the requested content is deemed to have sufficient popularity to merit generation of an associated multi-file. If the frequency counter does not equal the threshold value, then the multi-file processing at cache server 405 does not proceed. Note that the frequency counter can be incremented either before or after it is compared with the popularity threshold value at processing step 455.

In another example embodiment, the popularity threshold module 450 combines a temporal component with the number of times a resource has been requested in order to ascertain the popularity of a requested resource. As an example, a media resource may be deemed to have sufficient popularity for multi-file generation if at least a threshold number of requests for the requested media resource have occurred within a retrospective time period from when the requested media resource was requested (e.g., determine if media resource A has been requested at least 100 times within the preceding hour from when this latest request for media resource A was received).

If both the requested resource is eligible and has sufficient popularity for multi-file generation, then the multi-file processing is passed to multi-file generator 460. Multi-file generator 460 coordinates with the cache server 405 operating system, disk storage 425, and/or origin server (or other intermediate upstream server) to retrieve the necessary data for storage as a multi-file on the disk storage 425.

Still referring to FIG. 4, multi-file processing can pass from the multi-file generator 460 to the multi-file notifier 465 according to one example embodiment. The multi-file notifier 465 can notify other servers in the content delivery network 435 or elsewhere that a multi-file is being generated for a particular media resource (e.g., via communication path 470 to content delivery network 435). This may prompt other servers to preemptively generate multi-files for the particular media resource without having to perform the eligibility and/or popularity processing. Additionally, upstream servers (i.e., origin server, intermediate cache/content servers) can notify their downstream cache servers that particular media resources or content can be retrieved in multi-file format.

Figure 5:
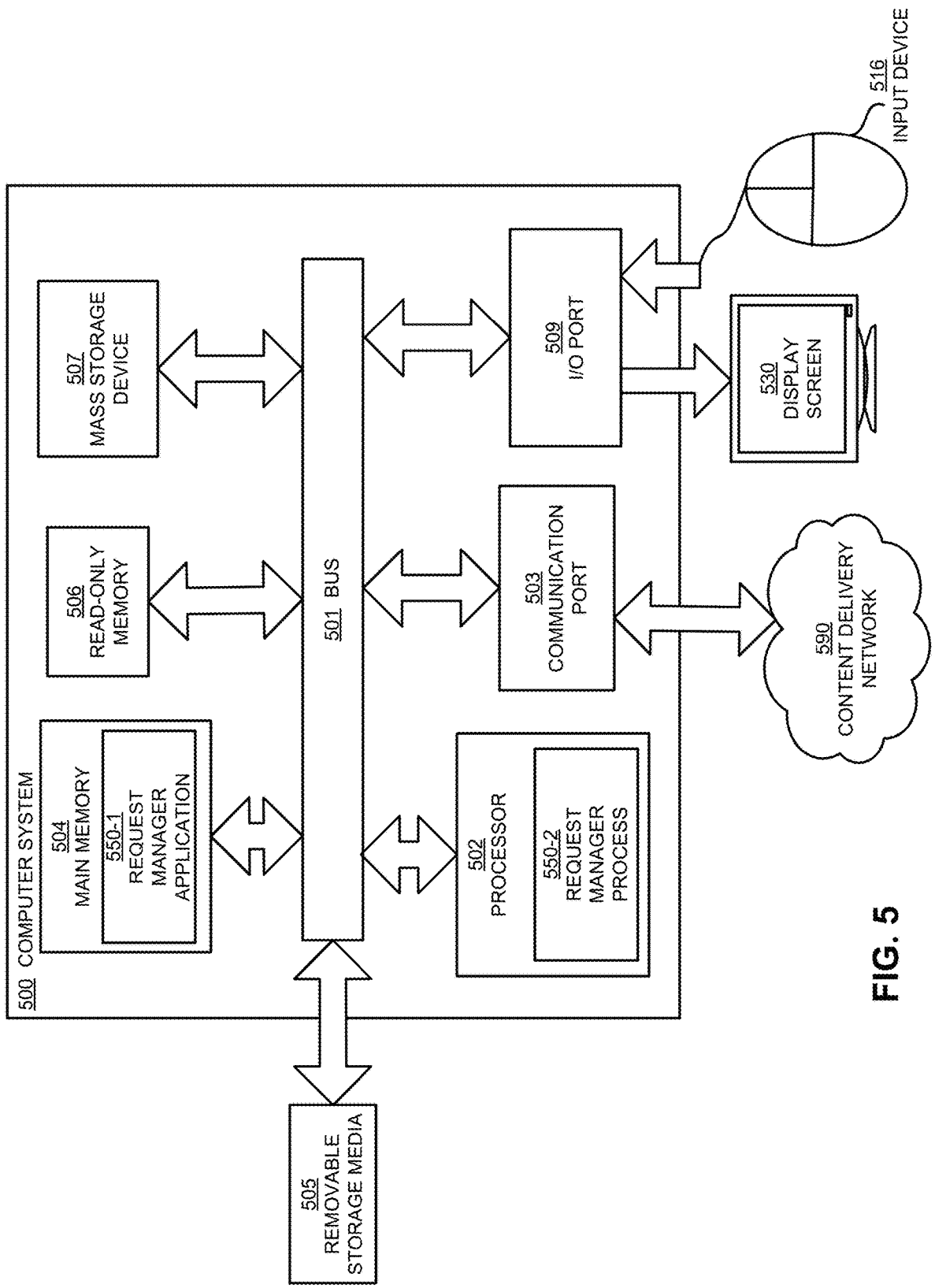
FIG. 5 is a block diagram of a computer system suitable for performing media resource storage and management in accordance with an example embodiment.

FIG. 5 is a schematic diagram of a computer system 500 (e.g., cache server, streaming server, replicating server, etc.) upon which embodiments of the present invention may be carried out and/or implemented.

According to the present example, the computer system 500 includes a bus 501 (i.e., interconnect), at least one processor 502, at least one communications port 503, a main memory 504, a removable storage media 505, a read-only memory 506, and a mass storage 507. Processor(s) 502 can be any known processor. Communications ports 503 can be any of an RS-232 port for use with a modem based dial-up connection, a 10/100 Ethernet port, a Gigabit port using copper or fiber, a USB port, and so on. Communications port(s) 503 may be chosen depending on a network such as a Local Area Network (LAN), a Wide Area Network (WAN), or any network to which the computer system 500 connects (e.g., content delivery network 590). The computer system 500 may be in communication with peripheral devices (e.g., display screen 530, input device 516) via Input/Output (I/O) port 509.

Main memory 504 can be Random Access Memory (RAM), or any other dynamic storage device(s) commonly known in the art. Read-only memory 506 can be any static storage device(s) such as Programmable Read-Only Memory (PROM) chips for storing static information such as instructions for processor 502. Mass storage 507 (e.g., disk storage system) can be used to store information and instructions.

Bus 501 communicatively couples processor(s) 502 with the other memory, storage and communications blocks. Removable storage media 505 can be any kind of external hard-drive commonly known in the art.

Note that cache systems and disk storage systems discussed throughout this specification can include any one (or any combination) of the memory and/or storage systems previously described, as well as any other memory and/or storage systems commonly used in content delivery networks.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 504 is encoded with request manager application 550-1 that supports functionality as discussed above and as discussed further below. Request manager application 550-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 502 accesses main memory 504 via the use of bus 501 in order to launch, run, execute, interpret or otherwise perform the logic instructions of the request manager application 550-1. Execution of request manager application 550-1 produces processing functionality in request manager process 550-2. In other words, the request manager process 550-2 represents one or more portions of the request manager application 550-1 performing within or upon the processor(s) 502 in the computer system 500.

It should be noted that, in addition to the request manager process 550-2 that carries out method operations as discussed herein, other embodiments herein include the request manager application 550-1 itself (i.e., the un-executed or non-performing logic instructions and/or data). The request manager application 550-1 may be stored on a computer readable medium (e.g., a repository) such as a floppy disk, hard disk or in an optical medium. According to other embodiments, the request manager application 550-1 can also be stored in a memory type system such as in firmware, read only memory (ROM), or, as in this example, as executable code within the main memory 504 (e.g., within Random Access Memory or RAM). For example, request manager application 550-1 may also be stored in removable storage media 505, read-only memory 506, and/or mass storage device 507.

In addition to these embodiments, it should also be noted that other embodiments herein include the execution of the request manager application 550-1 in processor(s) 502 as the request manager process 550-2. Thus, those skilled in the art will understand that the computer system 500 can include other processes and/or software and hardware components, such as an operating system that controls allocation and use of hardware resources. As such, the request manager 550 (application 550-1 and process 550-2) may be implemented on the same computerized device 500 (e.g., router, server, etc.) as the same or separately executed processes, or on separate devices in various combinations as the same or separately executed processes. In particular, the modules and processing steps described with respect to FIG. 4, and shown in a logical configuration for purposes of example only, can be implemented as single, separate, or any combination of software and/or hardware processes and applications, and/or be embodied as computer-readable instructions.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

FIGS. 6-10 include flowcharts according to embodiments herein. The rectangular elements are herein denoted as "steps" and represent computer software instructions or groups of instructions that carry out such functions. The flow diagrams do not necessarily depict the syntax of any particular programming language. Rather, the flow diagrams illustrate the functional information one of ordinary skill in the art could use to fabricate circuits or to generate computer software (or a hybrid of both circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 6:
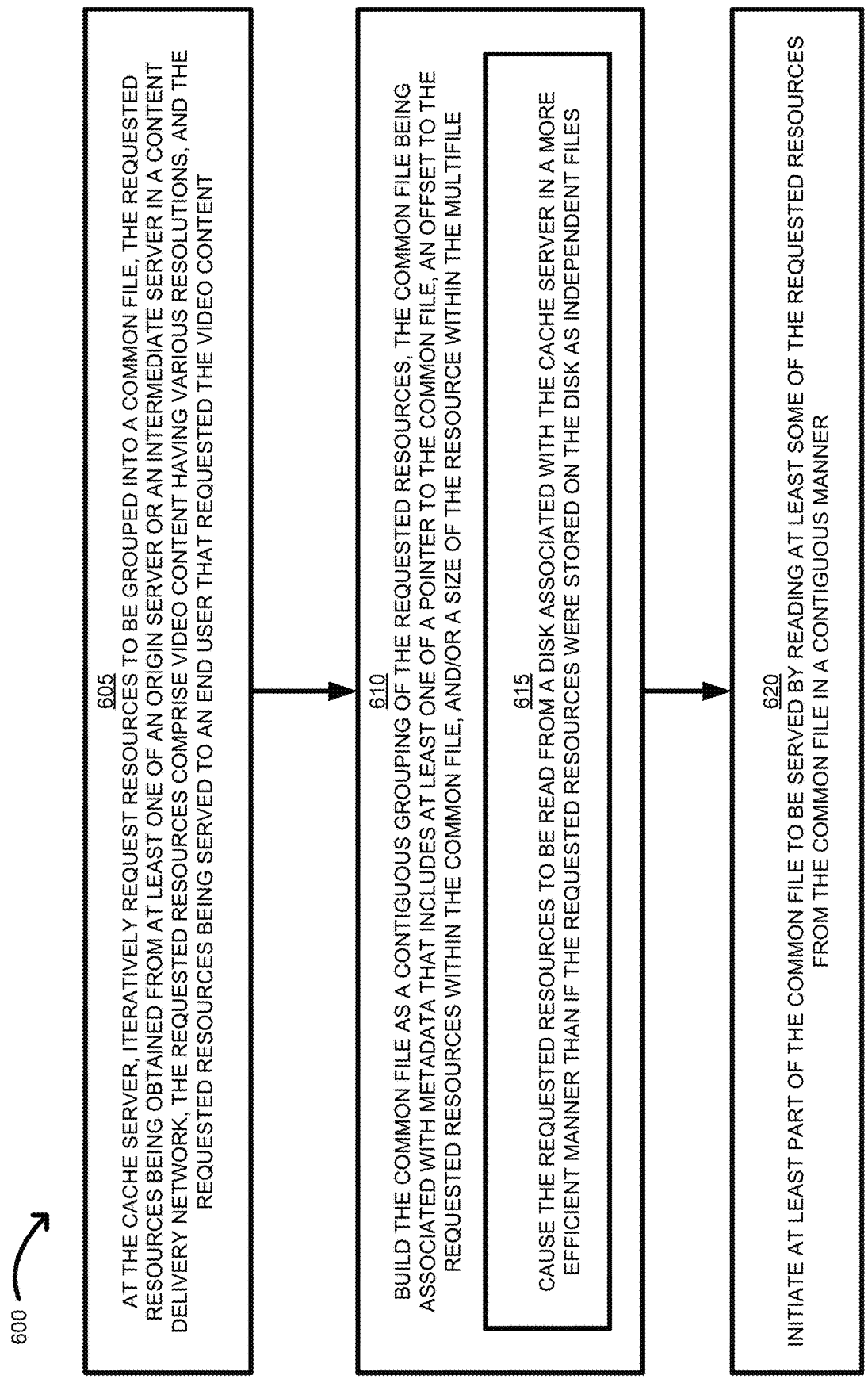
FIG. 6 is a flow chart that shows processing operations performed by a request manager in accordance with an example embodiment.

FIG. 6 is a flow chart 600 of processing steps that shows processing operations performed by the request manager 550 (i.e., request manager application 550-1 and/or the run-time implementation of request manager process 550-2) in accordance with one example embodiment. Note that throughout the discussion of the flow charts, the request manager 550 performs the same or similar functionality as the resource processing module.

In step 605, at the cache server, the request manager 550 iteratively requests resources to be grouped into a common file (i.e., multi-file). In one embodiment, the requested resources are obtained from at least one of an origin server or an intermediate server in a content delivery network. According to another embodiment, the requested resources comprise video content having various resolutions, wherein the requested resources are eventually served (initiated by the request manager 550) to an end user that requested the video content.

In step 610, as the resources arrive at the cache server, the request manager 550 builds the common file as a contiguous grouping of the requested resources.

In step 615, by building the common file as a contiguous grouping, the request manager 550 causes the requested resources to be read from a disk associated with the cache server in a more efficient manner (e.g., less disk read time) than if the requested resources were stored on the disk as independent files (i.e., not in a common file or multi-file).

In step 620, the request manager 550 initiates at least part of the common file to be served (e.g., to the end user) by reading at least some of the requested resources from the common file in a contiguous manner.

According to an example embodiment, prior to the step of iteratively requesting resources, the request manager 550 determines that the requested resources are eligible to be grouped into a common file when a Uniform Resource Locator (URL) associated with the requested resources matches a regular expression. Furthermore, the step of iteratively requesting resources is initiated after a determination that the requested resources exceed a popularity threshold (e.g., the number of hits equals or exceeds a target, trigger, popularity, etc., value).

Figure 7:
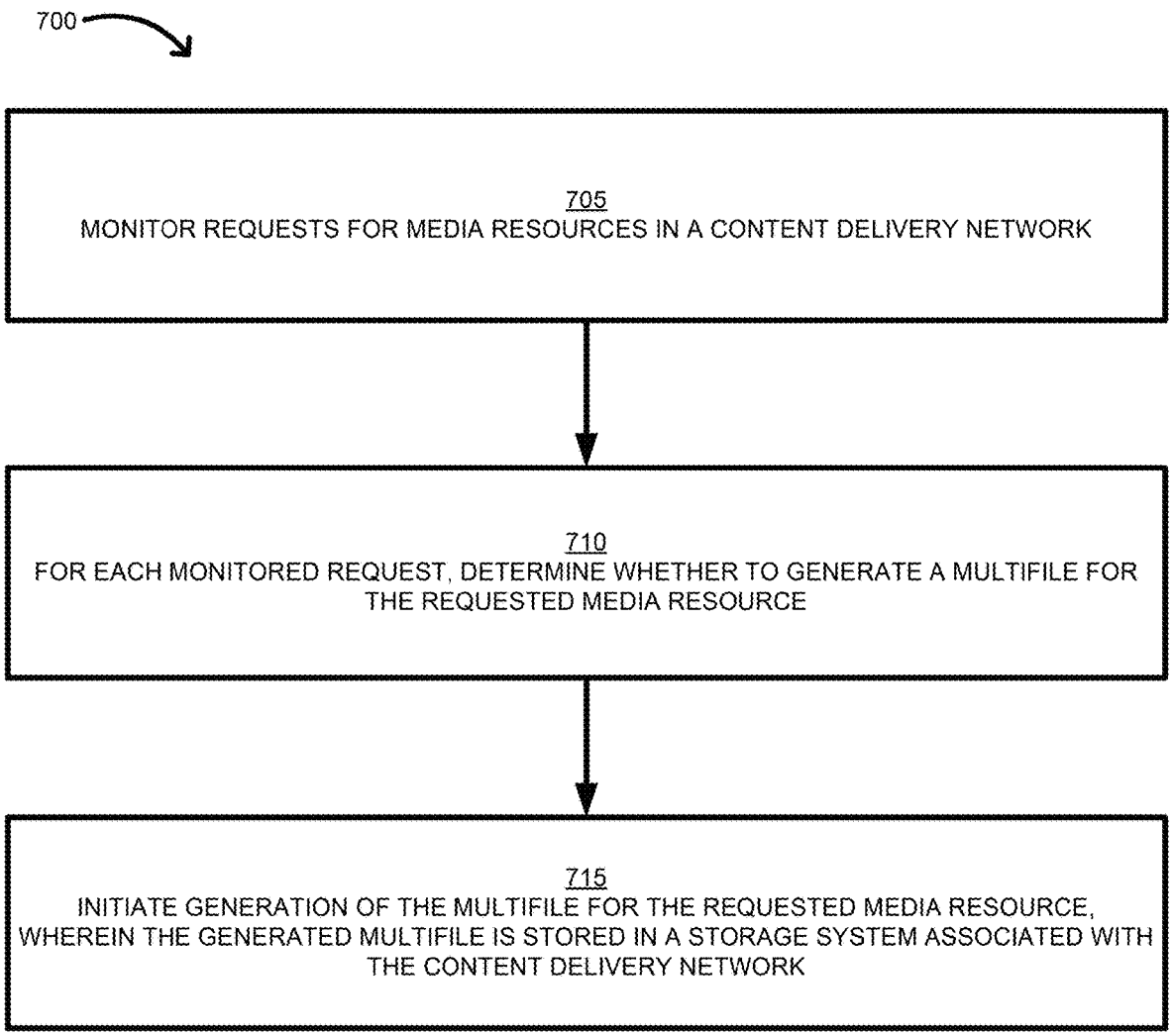
FIG. 7 is a flow chart that shows processing operations performed by a request manager in accordance with an example embodiment.

FIG. 7 is a flow chart 700 of processing steps that shows processing operations performed by the request manager 550 (i.e., resource processing module) in accordance with one example embodiment.

In step 705, the request manager 550 monitors requests for media resources (e.g., content such as music, media, software, web pages, etc.) in a content delivery network (e.g., content delivery network 105).

In step 710, for each monitored request, the request manager 550 determines whether to generate a multi-file for the requested media resource. For example, the request manager 550 will not generate (or build) a multi-file for a given media resource if a multi-file has already been generated for that media resource.

In step 715, the request manager 550 initiates generation of the multi-file for the requested media resource. In one example embodiment, the generated multi-file is stored in a storage system (e.g., disk-based storage system) associated with the content delivery network.

Figure 8:
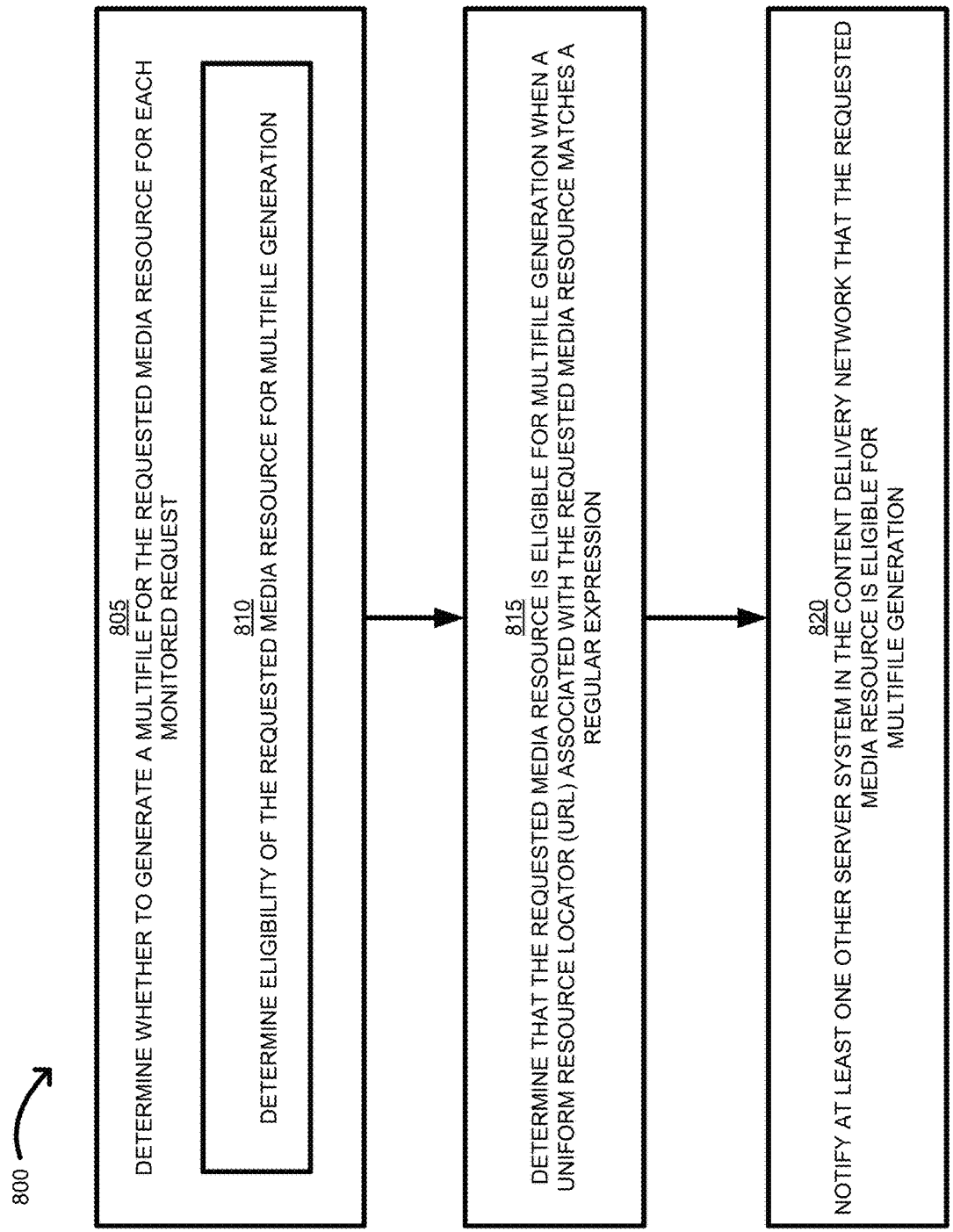
FIG. 8 is a flow chart that shows processing operations performed by a request manager in accordance with an example embodiment.

FIG. 8 is a flow chart 800 of processing steps that shows processing operations performed by the request manager 550 (i.e., resource processing module) in accordance with one example embodiment.

In step 805, for each monitored request, the request manager 550 determines whether to generate a multi-file for the requested media resource.

In step 810, the request manager 550 determines eligibility of the requested media resource for multi-file generation. It should be noted that the request manager 550 can use pattern recognition and/or sequence forecasting techniques commonly known in the art to determine eligibility of a given media resource.

In step 815, the request manager 550 can determine that the requested media resource is eligible for multi-file generation when a Uniform Resource Locator (URL) associated with the requested media resource matches a regular expression.

In step 820, in response to a determination that the requested media resource is eligible for multi-file generation, the request manager 550 notifies at least one other server system in the content delivery network that the requested media resource is eligible for multi-file generation. For example, the request manager 550 can notify other cache servers in the content delivery network and/or other upstream servers in the content delivery network such as the origin server. Thus, multi-files may be generated on storage systems both local and remote to the cache server executing the request manager 550 (i.e., resource processor module). This technique therefore can be implemented in multi-tiered network architectures.

Figure 9:
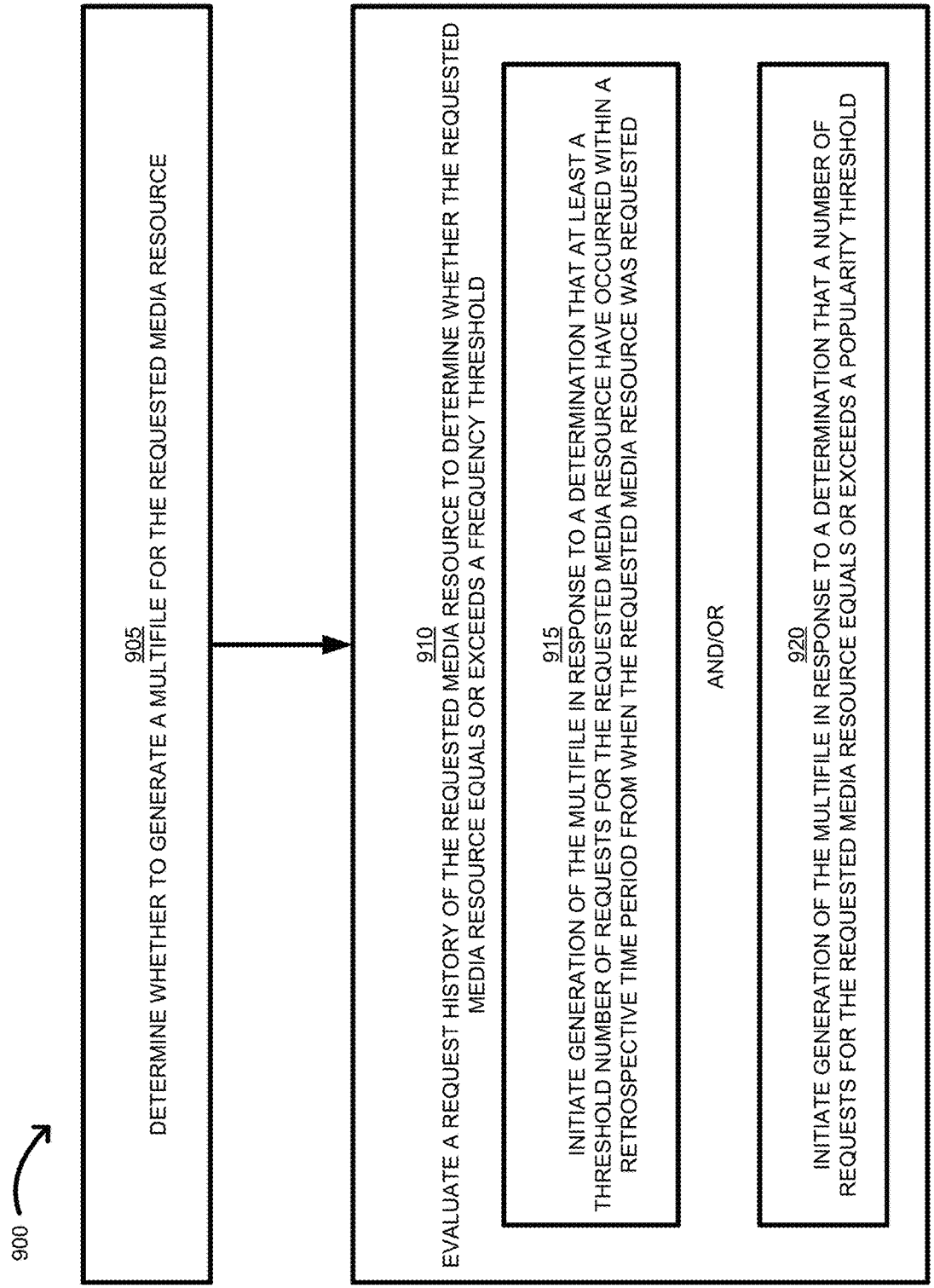
FIG. 9 is a flow chart that shows processing operations performed by a request manager in accordance with an example embodiment.

FIG. 9 is a flow chart 900 of processing steps that shows processing operations performed by the request manager 550 (i.e., resource processing module) in accordance with one example embodiment.

In step 905, for each monitored request, the request manager 550 determines whether to generate a multi-file for the requested media resource.

In step 910, the request manager 550 evaluates a request history of the requested media resource to determine whether the requested media resource equals or exceeds a frequency threshold.

In step 915, the request manager 550 initiates generation of the multi-file in response to a determination that at least a threshold number of requests for the requested media resource have occurred within a retrospective time period from when the requested media resource was requested. In other words, this technique is useful in determining the popularity of a given media resource.

In step 920, the request manager 550 initiates generation of the multi-file in response to a determination that a number of requests for the requested media resource equals or exceeds a popularity threshold. If, for example, the number of requests for the requested media resource does not equal or exceed the popularity threshold, then the request manager 550 can increment a request counter associated with that particular media resource.

In one example embodiment, a multi-file can represent portions of an associated media resource. The multi-file can include metadata that indicates the size of the given multi-file and a start pointer, an offset pointer and/or an end pointer within the storage system.

Furthermore, according to one example embodiment the generated multi-file represents sequential portions of the requested media resource stored in a substantially sequential manner in the storage system (e.g., disk-based storage system).

It should be noted that the request eligibility of the requested media comprises using at least one of pattern recognition algorithms and sequence forecasting algorithms.

Figure 10:
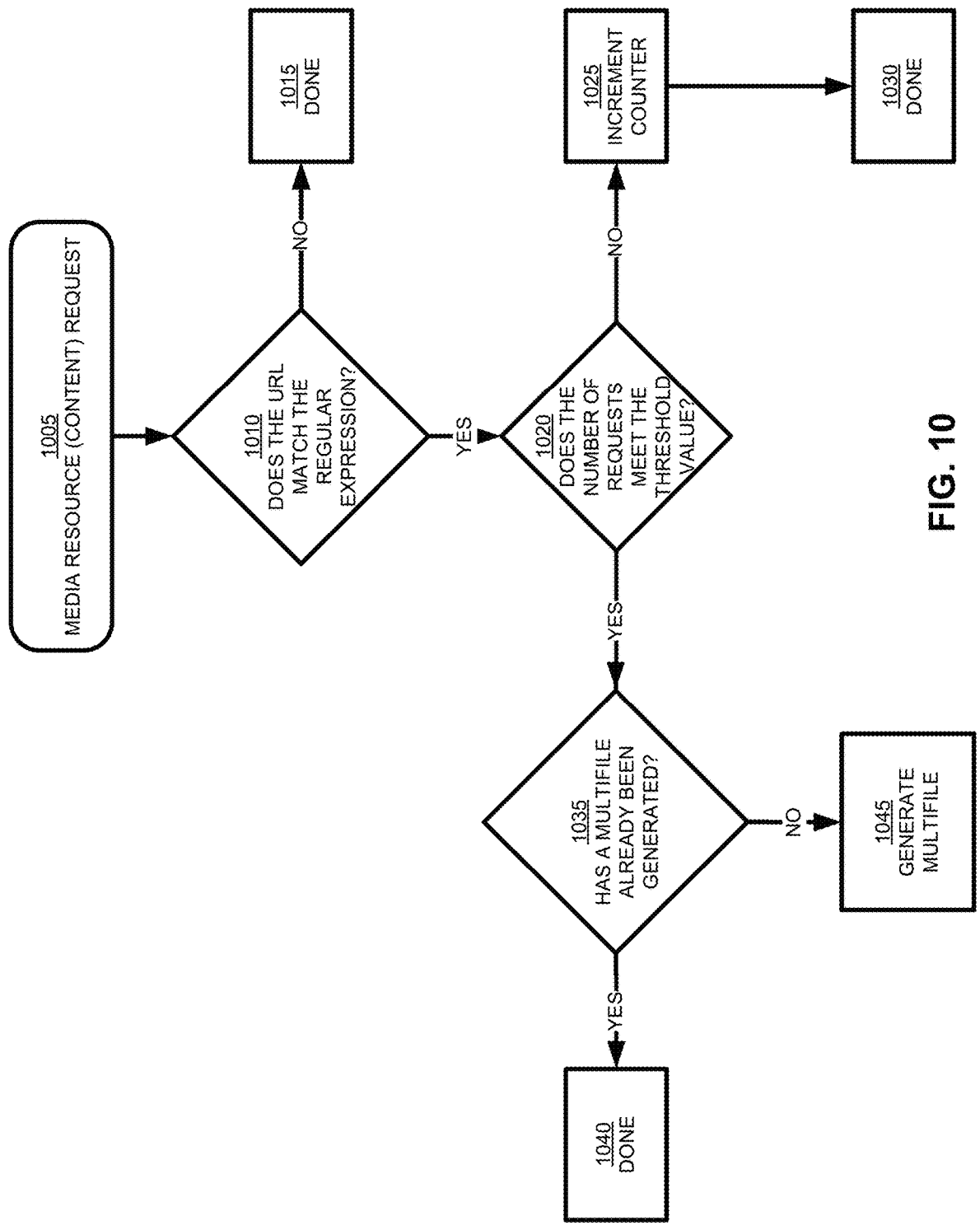
FIG. 10 is a flow chart that shows processing operations performed by a request manager in accordance with an example embodiment.

FIG. 10 is a flow chart 1000 of processing steps that shows processing operations performed by the request manager 550 (i.e., resource processing module) in accordance with one example embodiment.

In step 1005, request manager 550 receives a URL associated with a media resource request. In step 810, the request manager 550 determines whether the URL matches a regular expression. If there is no match, then multi-file processing terminates at step. 815.

If the URL does match the regular expression, in step 1020 the request manager 550 determines whether the number of requests for this particular media resource equals and/or exceeds a popularity threshold value.

If the threshold value (e.g., popularity indicator) is not met, the request manager 550 increments a counter associated with this particular media resource at step 1025. Multi-file process terminates after incrementing the counter at step 1030.

If the threshold value is equaled and/or exceeded, the request manager 550 determines whether a multi-file has already been generated for this particular media resource. If yes, then multi-file processing terminates at step 1040.

If a multi-file has not been generated, the request manager 550 generates a multi-file associated with the requested media resource at step 1045.

Example

Certain aspects of video content distribution and rendering can benefit from the use of multifiles. Video content such as movies can be considered to be a stream a consecutive frames. Various encoding schemes may compress some of the frames. The logical structure of a typical movie 1102 is shown in FIG. 11A (regardless of the encoding scheme used). From an end-user's perspective, when the movie is viewed (on TV or computer or the like), the frames are shown in succession, starting with a first frame of the video. The arrow in the drawing shows the direction of play of the video frames.

When streaming video content (e.g., movies, and the like) it is often useful and desirable to provide end users with the ability to move around within the video. For example, end users may wish to be able to pause a movie and/or to fast-forward (or fast-reverse) within the movie. In this regard, the video is split into a number of segments (preferably of approximately equal duration), and the end-user is presented with an interface that supports movement between the segments.

In the exemplary video 1102 of FIG. 11A, the video is split into n segments. The starting point of each segment is denoted Pi in the drawing, so that there are n starting points denoted P1, P2, P3, . . . , Pn−1, Pn. Associated with each of these starting points is a corresponding video frame F1, F2, F3, . . . , Fn−1, Fn.

FIG. 11D shows a typical display 1106 (e.g., of a TV or computer or the like) in which an end-user is provided with an interface to move around within a video. As shown in FIG. 11D, the user is provided with an image corresponding to each of the n frames (F1, F2, F3, . . . , Fn−1, Fn). The user may also be provided with other frame information (e.g., the time of that frame within the movie). The user may use controls (e.g., on-screen controls 1108) to move between frames and to select a frame (and thereby a starting point within the movie) from which to begin or continue viewing.

FIG. 11B shows a multifile 1104 formed from the n frames (F1, F2, F3, . . . , Fn−1, Fn) of the movie 1102. FIG. 11C shows a multifile 1105 formed from the n frames (F1, F2, F3, . . . , Fn−1, Fn) of the movie 1102, along with meta-data M1, M2, . . . , Mn relating to those frames. The meta-data may include, e.g., timing or other information that may be provided (directly or otherwise) to the user. The meta-data may also include information that can be used by the system to help identify and retrieve the portion of the movie that the user selects. The meta-data may include offset data into a file representing the movie.

The video delivery system may provide this multifile 1104 to the end-user at the start of transmission of the video or at some early point in its transmission. In this manner, when an end-user wishes to control movement within a video, the system (e.g., TV, computer, etc.) already has the frame images needed to produce the control display (e.g., as shown in FIG. 11D).

Those of skill in the art will realize and understand, upon reading this description, that FIGS. 11B-11C are logical depictions of the multifiles 1104 and 1105, and that they do not impose or imply any ordering of the information stored in those files. Furthermore, it should be understood that other information may be included in those files. It should further be understood that the multifiles 1104 and 1105 may, themselves, be split into more than one file.

Figure 12:
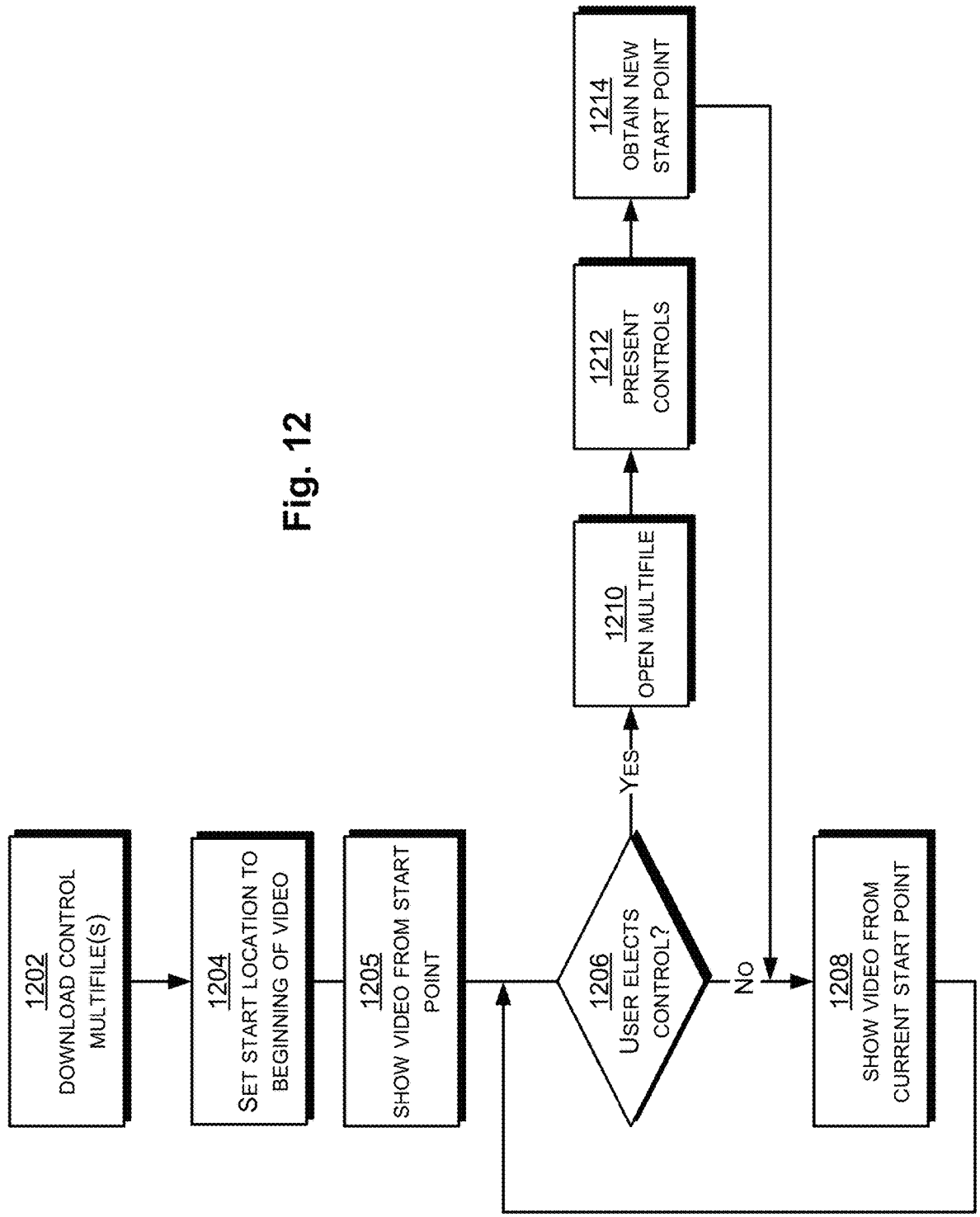
FIG. 12 is a flowchart depicting the use of a multifile for video content.

FIG. 12 is a flowchart showing operation of an exemplary client system (e.g., computer, TV or the like). The end-user selects a movie to be streamed to his device (in a known manner). The device obtains (e.g., downloads) the control multifile(s) (e.g., multifiles 1104, 1105) corresponding to the selected movie (at 1202). The system sets the start location of the movie to the beginning of the movie and begins playing (at 1204, 1205). If the user elects to control the movie (e.g., the user pauses or tries to fast forward) (at 1206), then the movie is paused and the system opens the necessary multifile(s) (at 1210). The system then extracts the needed data (e.g., frame images and associated meta data) from the multifile(s) and presents the controls (e.g., as shown in FIG. 11D) to the user (at 1212). The user may then use the controls to move around through the movie, potentially picking a new location in the movie from which to continue viewing. This location (which may correspond to the location at which the movie was paused) is set as the start point (at 1214), and the movie continues showing from the current start point (at 1208).

It should be appreciated that in the general case, from an end-user/client's perspective, multifile processing is handled entirely on and by the cache servers. In the example just presented however, the multifiles may require client-side software, since the multifile includes metadata that are useful for positioning within the video. In some cases existing client-side software already uses such metadata, in which case the processing may take place on the cache server(s).

For example, a video/movie provider may provide end-users/clients with the ability (e.g., via an on-screen interface) to move around within a movie. In these cases, the content provider already needs to provide multiple images corresponding to each of a number of jump locations in the movie. The content provider therefore already has multiple small files, one for each of these starting images (corresponding to the Fi in FIGS. 11A-11C). In these cases the use of a multifile to contain all of the images will improve performance when an end-user/client chooses to move around within a movie. Each time the user decides to control movement within the video, the multifile containing the multiple images can be loaded in order to provide the user with an on-screen display such as, e.g., shown in FIG. 11D. Note that in this case there is no need for additional client-side processing, since the rendering system on the client-side is already expecting to obtain and load multiple files.

With reference again to FIGS. 11A-11B, assume that each frame Fi has a corresponding small file, each file having its own URL. Without the use of multifiles, when the user begins moving around within the movie, in order to provide the user with an on-screen display such as is shown in FIG. 11D, the system would have to request and load n files, one for each of the n frames F1 . . . Fn. In this case the cache server to which the client is connected would have to store n separate frames or images. Since these frames are likely to be needed at the same time, it is desirable to create a multifile from them.

Those of skill in the art will realize and understand, upon reading this description, that the exact order of steps in the above flow is given by way of example. While it is preferable for the multifile(s) to be available to the user when they are needed, they may be obtained at some other time in the flow. For example, the multifile(s) may be obtained at the time the user first tries to control the movie. Although this approach may delay the initial display of the controls, subsequent displays will be quick because the system will already have the needed multifiles.

Although the present invention has been described with reference to various embodiments, it will be understood that the invention is not limited to the details thereof. Various modifications and substitutions will occur to those of ordinary skill in the art. All such substitutions are intended to be embraced within the scope of the invention.

We claim:

1. A computer-implemented method comprising:
   receiving a request for a video stream;
   determining whether a frequency of requests for the video stream exceeds a threshold;
   in response to the frequency exceeding the threshold, obtaining a plurality of images in a video stream, wherein the obtaining the plurality of images comprises:
      dividing the video stream into n logically contiguous segments, each segment having a corresponding start point, and each start point having a corresponding video frame associated therewith; and
      for a set of two or more logically contiguous segments of the n logically contiguous segments:
         determining a start video frame corresponding substantially to the start point of a particular logical segment in the set, and
         identifying an image of the plurality of images corresponding to the start video frame;
      forming a common file comprising a contiguous grouping of the plurality of images; and
      providing the common file wherein the common file allows the user to move to a new location in the video stream to continue viewing the video stream from the new location.

2. The method of claim 1 wherein the n logically continuous segments are of approximately equal duration.

3. The method of claim 1 wherein the obtaining the plurality of images further comprises:
   determining a distinct location in the particular segment of the set; and
   determining a distinct image of the plurality of images corresponding to a video frame for the distinct location.

4. The method of claim 3 wherein the common file comprises the distinct image.

5. The method of claim 1 further comprising:
   determining metadata associated with the start video frame, wherein the common file comprises at least some of the metadata.

6. The method of claim 5 wherein the metadata comprises at least one of timing information or location information.

7. The method of claim 1, wherein the video stream comprises a movie and wherein the common file is provided with the movie.

8. A system comprising:
   at least one processor; and
   memory encoding computer executable instructions that, when executed by the at least one processor, cause the system to perform a method, the method comprising:
      dividing a video stream into n distinct logically contiguous video segments, and then determining n locations in said video stream, each of the n locations corresponding to a start position of a corresponding one of the n video segments, wherein the i-th location corresponds to a start of the i-th video segment, for each i from 1 to n;
      determining n video frames F1, . . . , Fn, by, for each location j of the n distinct locations, determining a corresponding video frame Fj substantially at or near said location j, wherein the j-th video frame Fj corresponds to a start video frame of the jth video segment, for each j from 1 to n;

determining n images corresponding to the n video frames, wherein, for each location j of the n distinct locations, the j-th image of the n images corresponds to the start video frame Fj of the j-th video segment;

building a common file comprising an ordered contiguous grouping of the n images, said common file being distinct from the video stream; and providing the common file.

9. The system of claim 8, wherein the plurality of video segments are of approximately equal duration.

10. The system of claim 8, wherein the method further comprises determining metadata associated with the n distinct locations in the video stream, wherein the common file comprises at least some of the metadata.

11. The system of claim 10, wherein the metadata comprises at least one of timing information or location information.

12. The system of claim 10, wherein the metadata comprise metadata M1, ..., Mn relating to each of the frames F1, ..., Fn, where metadata Mj relates to frame Fj, for j=1 to n.

13. The system of claim 8, wherein the video stream comprises a movie and wherein the common file is provided with the movie.

14. A system comprising:

at least one processor; and memory encoding computer executable instructions that, when executed by the at least one processor, cause the system to perform a method, the method comprising:

receiving request for a video stream;

determining whether a frequency of requests for the video stream exceeds a threshold;

in response to the frequency exceeding the threshold, obtaining a plurality of images in a video stream, wherein the obtaining the plurality of images comprises:

dividing the video stream into n logically contiguous segments, each segment having a corresponding start point, and each start point having a corresponding video frame associated therewith; and for a set of two or more logically contiguous segments of the n logically contiguous segments:

determining a start video frame corresponding substantially to the start point of a particular logical segment in the set, and identifying an image of the plurality of images corresponding to the start video frame;

forming a common file comprising a contiguous grouping of the plurality of images; and providing the common file, wherein the common file allows the user to move to a new location in the video stream to continue viewing the video stream from the new location.

15. The system of claim 14, wherein the n logically continuous segments are of approximately equal duration.

16. The system of claim 14, wherein the obtaining the plurality of images further comprises:

determining a distinct location in the particular segment of the set; and determining a distinct image of the plurality of images corresponding to a video frame.

17. The system of claim 16 wherein the common file comprises the distinct image.

18. The system of claim 14, wherein the method further comprises:

determining metadata associated with the start video frame, wherein the common file comprises at least some of the metadata.

19. The system of claim 18, wherein the metadata comprises at least one of timing information or location information.

20. The system of claim 14, wherein the video stream comprises a movie and wherein the common file is provided with the movie.

* * * * *